US010748453B2

(12) United States Patent
Jabbour et al.

(10) Patent No.: US 10,748,453 B2
(45) Date of Patent: Aug. 18, 2020

(54) MYRINGOTOMY SURGICAL TRAINING DEVICE WITH REAL-TIME AND STORED FEEDBACK ON PERFORMANCE

(71) Applicant: UNIVERSITY OF PITTSBURGH—OF THE COMMONWEALTH SYSTEM OF HIGHER EDUCATION, Pittsburgh, PA (US)

(72) Inventors: Noel Jabbour, Pittsburgh, PA (US); Jonathan M. Kenneson, Clarion, PA (US); Molly E. Knewtson, Pittsburgh, PA (US); Joseph T. Samosky, Pittsburgh, PA (US)

(73) Assignee: University of Pittsburgh-Of the Commonwealth Systems of the Higher Education, Pittsburgh, PA (US)

( * ) Notice: Subject to any disclaimer, the term of this patent is extended or adjusted under 35 U.S.C. 154(b) by 174 days.

(21) Appl. No.: 15/599,964

(22) Filed: May 19, 2017

(65) Prior Publication Data
US 2017/0337848 A1 Nov. 23, 2017

Related U.S. Application Data

(60) Provisional application No. 62/338,739, filed on May 19, 2016.

(51) Int. Cl.
*G09B 23/34* (2006.01)
*G09B 9/00* (2006.01)

(52) U.S. Cl.
CPC ............... *G09B 23/34* (2013.01); *G09B 9/00* (2013.01)

(58) Field of Classification Search
CPC ...... G09B 23/285; G09B 23/30; G09B 23/34; G09B 9/00; G09B 23/32; A61B 1/227
See application file for complete search history.

(56) References Cited

U.S. PATENT DOCUMENTS

| | | | | |
|---|---|---|---|---|
| 4,459,113 A | * | 7/1984 | Boscaro Gatti | G09B 23/285 434/272 |
| 5,295,694 A | * | 3/1994 | Levin | A63F 3/0478 128/898 |
| 5,997,307 A | * | 12/1999 | LeJeune, Jr. | G09B 23/30 434/262 |
| 6,033,370 A | | 3/2000 | Reinbold et al. | |
| 6,241,526 B1 | * | 6/2001 | Auran | G09B 23/32 434/262 |
| 7,665,995 B2 | * | 2/2010 | Toly | G09B 23/285 434/262 |

(Continued)

OTHER PUBLICATIONS

OtoSim—OtoSim, Aug. 17, 2017, pp. 1-5, http://otosim.com/otosim-2/.

(Continued)

*Primary Examiner* — Jerry-Daryl Fletcher
(74) *Attorney, Agent, or Firm* — Eckert Seamans Cherin & Mellott, LLC; Stephen A. Bucchianeri

(57) ABSTRACT

A system for performing a myringotomy training procedure placing a tympanostomy tube in a simulated ear drum of a patient includes a canal structure. The canal structure includes a tubular portion having an inner surface formed from a conductive material disposed about a longitudinal axis, the tubular portion having a first end, an opposite second end; and a thin membrane selectively coupled to the second end of the tubular portion.

22 Claims, 11 Drawing Sheets

(56) References Cited

U.S. PATENT DOCUMENTS

| | | | | |
|---|---|---|---|---|
| 7,850,455 B2* | 12/2010 | Cottler | ............... | G09B 23/34 434/262 |
| 7,988,561 B1* | 8/2011 | Lenkarski | ........... | A63F 3/00643 273/447 |
| 8,961,190 B2* | 2/2015 | Hart | ............... | G09B 23/30 434/267 |
| 2004/0126746 A1* | 7/2004 | Toly | ............... | G09B 23/28 434/262 |
| 2008/0050710 A1* | 2/2008 | Cottler | ............... | G09B 23/28 434/270 |
| 2010/0248200 A1* | 9/2010 | Ladak | ............... | G09B 23/285 434/262 |
| 2011/0136090 A1* | 6/2011 | Kazemi | ............... | G09B 23/283 434/263 |
| 2012/0034587 A1* | 2/2012 | Toly | ............... | G09B 23/285 434/267 |
| 2012/0088215 A1* | 4/2012 | Bellezzo | ............... | G09B 23/36 434/270 |
| 2013/0230837 A1* | 9/2013 | Meglan | ............... | G09B 23/28 434/262 |
| 2015/0221236 A1* | 8/2015 | Forte | ............... | G09B 23/285 434/262 |
| 2016/0293053 A1* | 10/2016 | Azevedo | ............... | G09B 23/28 |
| 2017/0061827 A1* | 3/2017 | Sherman | ............... | G09B 23/30 |

OTHER PUBLICATIONS

Paul Hong, et al., "An anatomically sound surgical simulation model for myringotomy and tympanostomy tube insertion", Elsevier Ireland Ltd., International Journal of Pediatric Otorhinolaryngology 78 (2014), pp. 522-529.

* cited by examiner

MYRINGOTOMY SURGICAL TRAINING DEVICE WITH REAL-TIME AND STORED FEEDBACK ON PERFORMANCE

CROSS REFERENCE TO RELATED APPLICATIONS

This application claims priority to U.S. provisional application No. 62/338,739 filed May 19, 2016, entitled "Myringotomy Surgical Training Device with Real-Time and Stored Feedback on Performance", the contents of which are incorporated herein by reference.

GOVERNMENT CONTRACT

This invention was made with government support under grant # IIP 1449702 awarded by the National Science Foundation (NSF). The government has certain rights in the invention.

BACKGROUND OF THE INVENTION

1. Field of the Invention

The present invention pertains generally to medical training devices, and, more particularly to medical training devices for training surgical procedures involving manipulations of surgical tools within an orifice of a patient. The present invention even more particularly pertains to training devices for performing a myringotomy procedure.

2. Description of the Related Art

Myringotomy and tympanostomy tube placement is one of the most common surgical procedures performed in the United States. It is often the first procedure learned by a junior resident in otolaryngology and is commonly not practiced prior to a first attempt on an actual patient. Novice surgeons are more likely to injure the external auditory canal (ear canal) or take a longer time to complete the procedure as compared to an experienced surgeon. This leads to increased costs and recovery time for the patient. Additionally, internationally, there are many countries with a significant burden of ear disease but no trained physicians to perform this simple procedure. Accordingly, there exists a need for a solution whereby physicians can practice the microsurgical skills required to perform a myringotomy procedure in a manner that is transferable to actual practice.

SUMMARY OF THE INVENTION

In one embodiment, a system for performing a myringotomy training procedure placing a tympanostomy tube in a simulated ear drum of a patient is provided. The system comprises a canal structure comprising: a tubular portion having an inner surface formed from a conductive material disposed about a longitudinal axis, the tubular portion having a first end, an opposite second end, and a thin membrane selectively coupled to the second end of the tubular portion.

The canal structure may be disposed in a frame that comprises a receptacle defined therein and the canal structure may be selectively disposed in the receptacle.

The frame may be formed from a nonconductive material.

The thin membrane may comprise a polymer film.

The second end of the tubular portion may be disposed at an oblique angle relative to a plane disposed perpendicular to a longitudinal axis of the tubular portion.

The system may further comprise a voltage source electrically connected to the conductive material of the tubular portion and to a medical tool formed from another conductive material so as to form a closed electrical circuit when the medical tool is in contact with the conductive material of the tubular portion.

The electrical circuit may comprise a visual indicator electrically connected therein.

The electrical circuit may comprise an audible indicator electrically connected therein.

The electrical circuit may comprises a vibro-tactile indicator electrically connected therein.

The canal structure may further include a flanged portion formed from a conductive material which extends outward from tubular portion at or about the first end, the flanged portion sized to prevent the canal structure from passing through the receptacle, wherein the system further comprises a voltage source electrically connected to the conductive material of the tubular portion via the flanged portion and to a medical tool formed from another conductive material so as to form a closed electrical circuit when the medical tool is in contact with the conductive material of the tubular portion, and wherein the medical tool is structured to be inserted into the tubular portion to perform operations on the membrane.

The electrical circuit may comprise an indicator electrically connected therein. The indicator may comprise at least one of a visual indicator, an audible indicator or a vibro-tactile indicator.

The system may further comprise an anatomically correct ear structure disposed about the first end of the tubular portion of the canal structure.

The system may further comprise a control unit electrically connected in the electrical circuit and an input/output device electrically connected to the control unit.

The input/output device may comprise a display screen.

The control unit may comprise an electronic memory which is structured to store data related to one or more procedures performed using the system.

The system may further comprise a capacitive proximity or touch sensing system. The capacitive proximity or touch sensing system may comprises a conductive layer disposed on or subjacent to the surface of the tubular portion.

A thin coating may be provided on the conductive layer, the thin coating being positioned and structured to be contacted by a surgical instrument during a procedure using the system.

The capacitive proximity or touch sensing system may comprise a capacitive proximity or touch sensor which is electrically connected to the conductive layer and is electrically connected to a control unit.

The capacitive touch sensing system may comprise an input/output device electrically connected to the control unit.

DETAILED DESCRIPTION OF EXEMPLARY EMBODIMENTS

Figure 1:
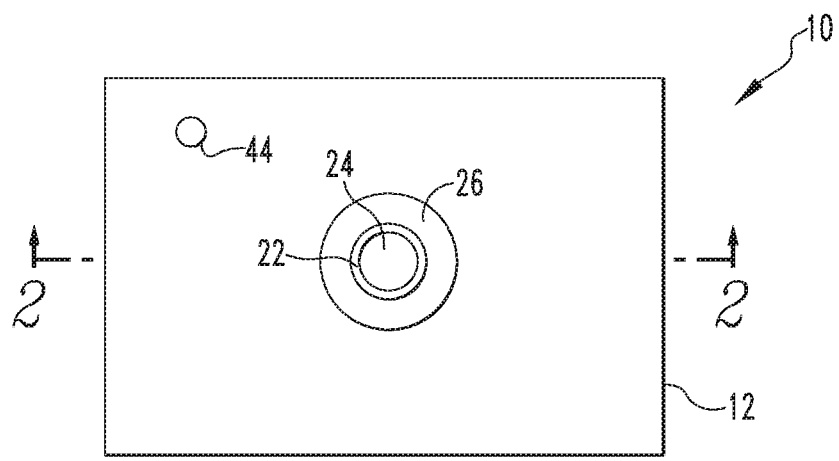
FIG. 1 is a top semi-schematic view of a training device in accordance with an example embodiment of the present invention.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

As used herein, the phrase "electrically connected" shall be used to refer to two or more elements which are connected via any suitable material which readily permits a flow of electrical current between such elements.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Embodiments of the present invention improve upon the prior art by providing systems which may be customized to fit a particular training scenario and incorporate feedback to the user. Other embodiments further incorporate anatomically correct features and provide for the use of standard surgical tools as would be employed in the operating room for an actual operation.

FIG. 1 shows a top semi-schematic view of a training device 10 for performing a myringotomy procedure placing a tympanostomy tube in a simulated ear drum of a patient in accordance with an example embodiment of the present invention. Training device 10 includes a frame or housing 12. In example embodiments of the present invention, housing 12 has been formed from plastic, cardboard, and even a tennis ball. Continuing to refer to FIG. 1, and additionally to FIGS. 2 and 3, training device 10 further includes a receptacle 14 which in the example embodiment illustrated is formed from a conductive tube (e.g., without limitation, a piece of copper pipe) having an inner diameter $d_1$. Receptacle 14 is secured to housing 12 such that a top opening 16 thereof is positioned to readily receive an insertable canal structure 20, such as shown in the partially exploded view of FIG. 3.

Insertable canal structure 20 includes a tubular portion 22 having a first end 22A and an opposite second end 22B. In the example embodiment shown in FIGS. 2 and 3, second end 22B is disposed at an oblique angle θ (FIG. 3) relative to a plane perpendicular to the longitudinal axis of tubular portion 22. Second end 22B is disposed at such angle θ in order to better simulate the geometric arrangement of the tympanic membrane relative to the canal as found in an actual human ear canal. Tubular portion 22 is formed from a conductive material (e.g., without limitation, a copper tube) having an inner diameter $d_2$. A thin membrane 24, which is intended to simulate the tympanic membrane (i.e., an ear drum) associated with a human ear, is selectively coupled to second end 22B of tubular portion 22. In example embodiments of the present invention, thin polymer films (e.g., without limitation, polyethylene film) have been employed with success. It is to be appreciated, however, that other suitable materials may be employed without varying from the scope of the present invention. Such selective coupling of membrane 24 may be accomplished via any suitable means (e.g., without limitation, a rubber band, a collar member) which provides for membrane 24 to be readily replaced without varying from the scope of the present invention. Although shown as a cylindrical member with second end 22B disposed at the angle θ, it is to be appreciated that one or more of the angle θ, the inner diameter $d_2$, the general shape, and the length of tubular portion 22 may be varied without varying from the scope of the present invention.

Figure 2:
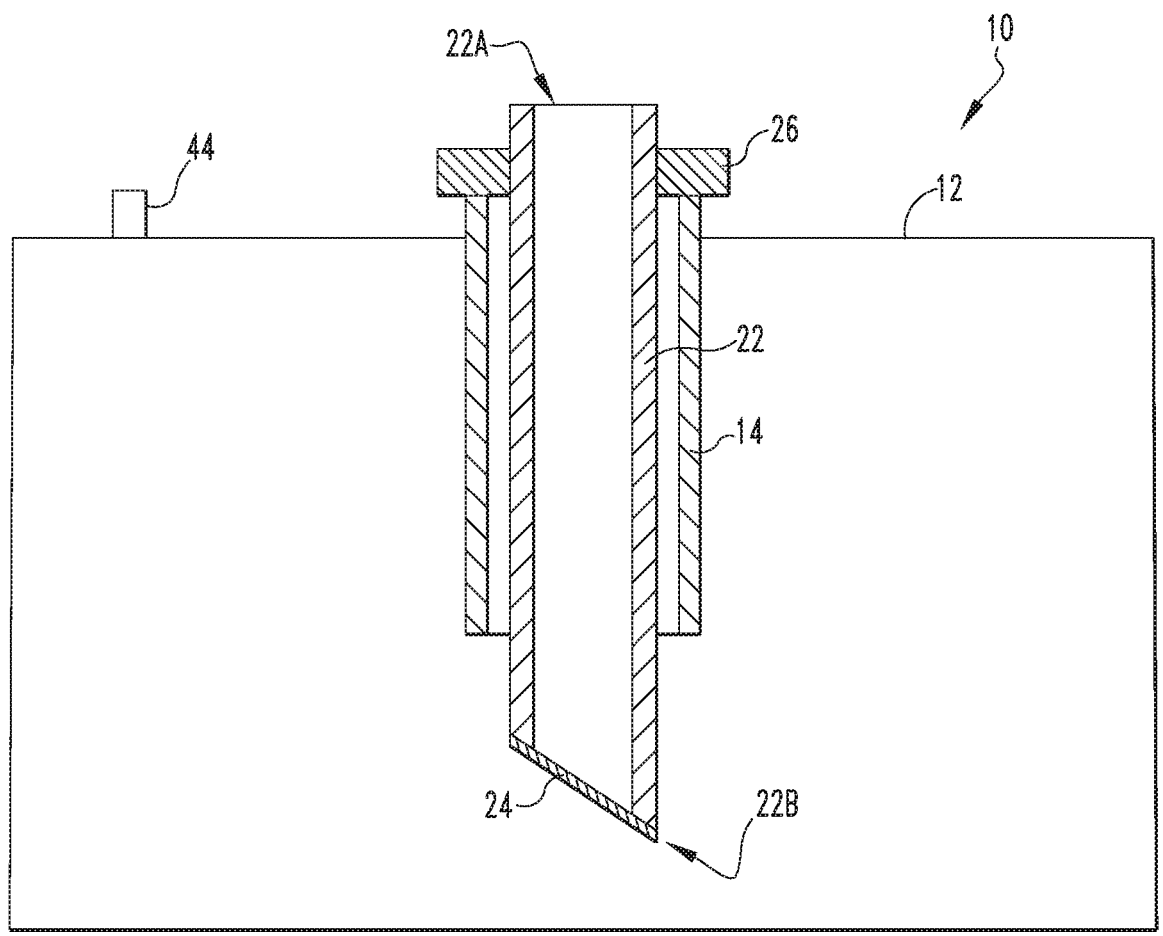
FIG. 2 is a semi-schematic section view of the training device of FIG. 1 taken along line 2-2 of FIG. 1.
Figure 3:
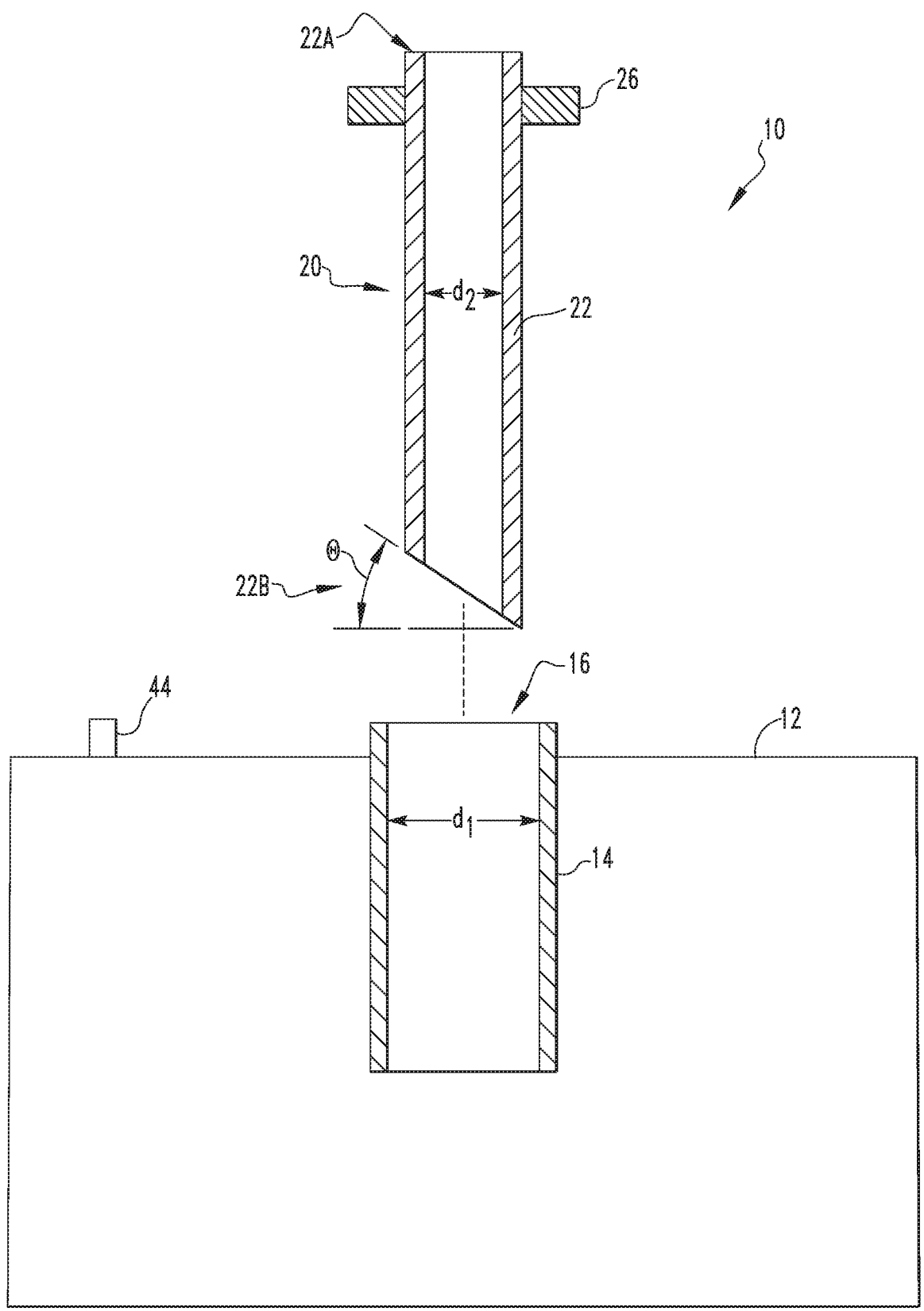
FIG. 3 is a partially exploded version of the view of FIG. 2 showing a removable canal structure disposed above a corresponding receptacle of the training device.

Continuing to refer to FIGS. 1-3, insertable canal structure 20 further includes a flanged portion 26 extending outward from tubular portion 22 at or about first end 22A. Flanged portion 26 is of sufficient size to prevent insertable canal structure 20 from passing through receptacle 14. Flanged portion 26 is formed from a conductive material such that when canal structure 20 is disposed in receptacle 14, such as shown in FIGS. 1 and 2, tubular portion 22 is thus electrically connected to receptacle 14 via at least flanged portion 26, the importance of which is discussed below. It is to be appreciated that such structure allows for canal structure 20 to be readily removed and installed in receptacle 14. Accordingly, membrane 24 may be easily replaced. Additionally, canal structures 20 having tubular portions 22 shaped and/or dimensioned to imitate particular physical structures may be readily swapped in/out with minimal downtime in training.

Figure 4:
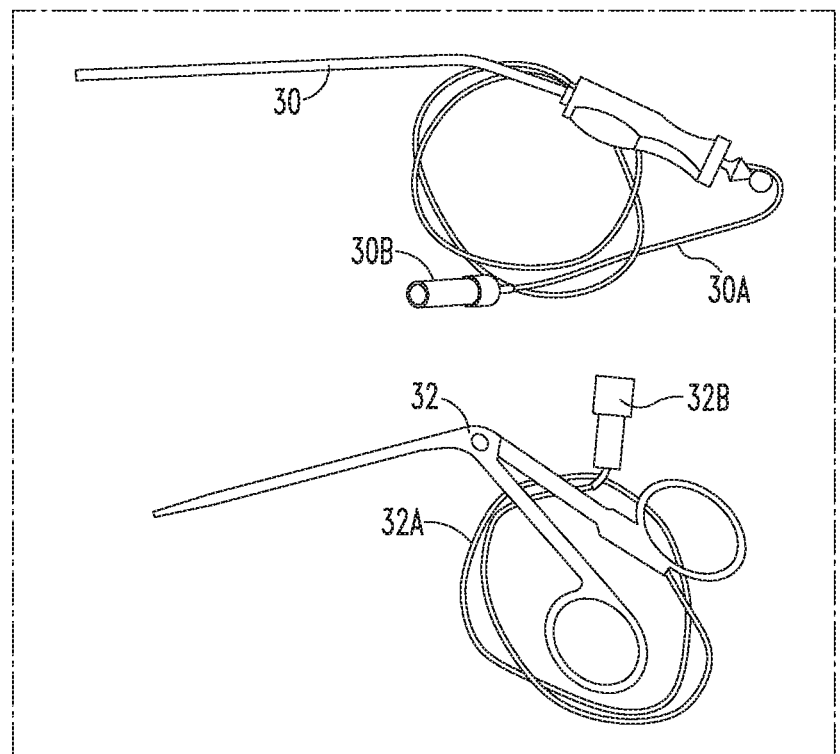
FIG. 4 shows some example medical tools which may be used in conjunction with the training device of FIG. 1.

FIG. 4 shows some example medical tools 30, 32 which may be used in conjunction with the training device of FIG. 1. More particularly, each of tools 30, 32 may be inserted into tubular portion 22 to perform manipulations on membrane 24 in a similar manner as such tools would be inserted into an ear canal of a human patient to perform manipulations of the patient's tympanic membrane (e.g., without limitation, tympanostomy tube placement). Each of tools 30, 32 is formed form an electrically conductive material (e.g., without limitation, steel) and includes a lead-wire 30A, 32A, of suitable length to generally not encumber manipulations of said tool. Each lead-wire 30A, 32A terminates in a suitable electrical connector 30B, 32B. It is to be appreciated that such tools are provided for example purposes only and that other tools may be employed in embodiments of the present invention without varying from the scope of the present invention.

Figure 5:
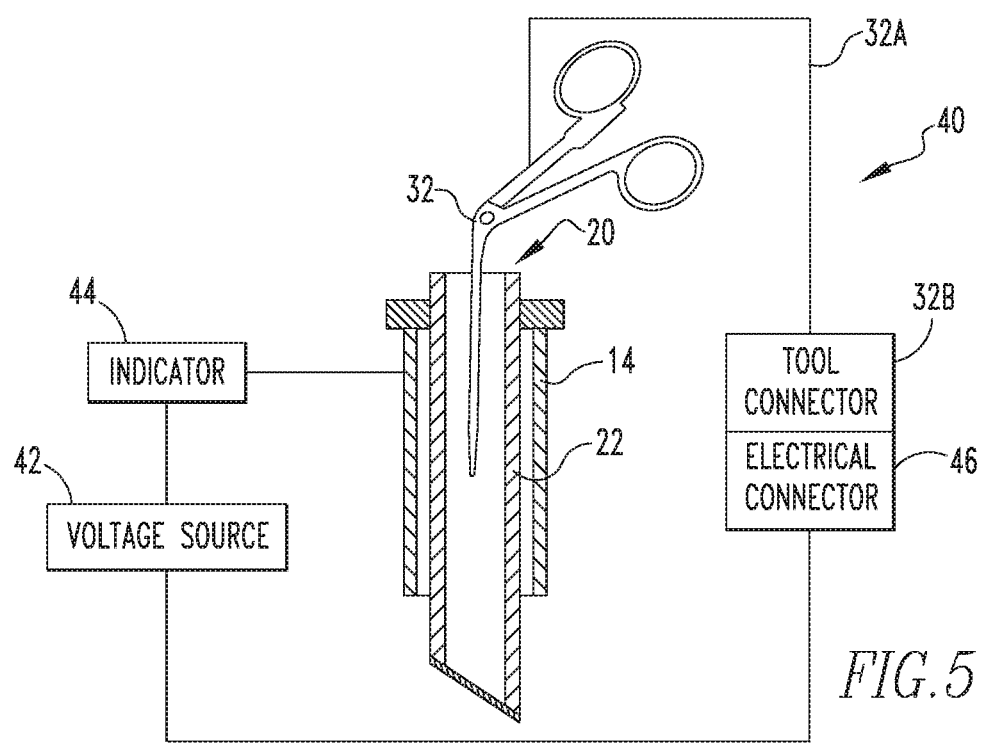
FIG. 5 shows a schematic electrical diagram of the major electrical components in the electrical circuit of the training device of FIG. 1.

FIG. 5 shows a schematic diagram of a circuit arrangement 40 of device 10 which provides for dynamic feedback of performance during a training procedure. Circuit arrangement 40 includes a voltage source 42 (e.g., without limitation, a battery), a terminal of which is electrically coupled to receptacle 14. An indicator 44 is disposed between voltage source 42 and receptacle 14 in a manner such that indicator 44 is "activated" when current passes between voltage source 42 and receptacle 14. Indicator 44 may be one or both of a visual indicator (e.g., without limitation, an LED) disposed on housing 12) or an audible indicator (e.g., without limitation, a "buzzer" device) disposed on or in housing 12. It is to be appreciated that other suitable indicators (e.g., a vibro-tactile indicator) may be employed without varying from the scope of the present invention.

Continuing to refer to FIG. 5, another terminal of voltage source 42 is electrically connected to medical tool 32 via a suitable connector 46 which electrically engages electrical connector 32B of lead-wire 32A of tool 32. It is to be appreciated that such arrangement allows for tools (e.g., tools 30 and 32) to be readily swapped by simply disconnecting the electrical connector (e.g., connector 30B or 32B) of the tool from electrical connector 46. It is to be appreciated that such arrangement provides for a circuit which is in an "open" state (i.e., no current flow) unless tool 32 is brought into contact with canal structure 20, thus "closing" circuit 40 (and thus causing current to flow) and activating indicator 44. Through such arrangement system 10 thus indicates to a user (i.e., a trainee) that they have touched the simulated canal wall, and thus produced an undesired result. In a real patient, such contact could cause abrasion or other injury to the canal wall. Such contact may also produce bleeding, which can compromise the surgeon's field of view of the tympanic membrane.

From the foregoing description, it is to be appreciated that the overall system described in conjunction with FIGS. 1-5 can be assembled with commonly available materials for under $10 (USD) while providing real-time objective feedback to users on errors (i.e. contacting the external auditory canal with the surgical instrument). Accordingly, such system provides a very low cost solution to existing training deficiencies that may be readily replicated from commonly available materials. It is envisioned that such embodiment may be provided as an assembly guide and open source design for use in developing countries that do not have access to advanced technologies nor have the means to afford a costly device.

Figure 6:
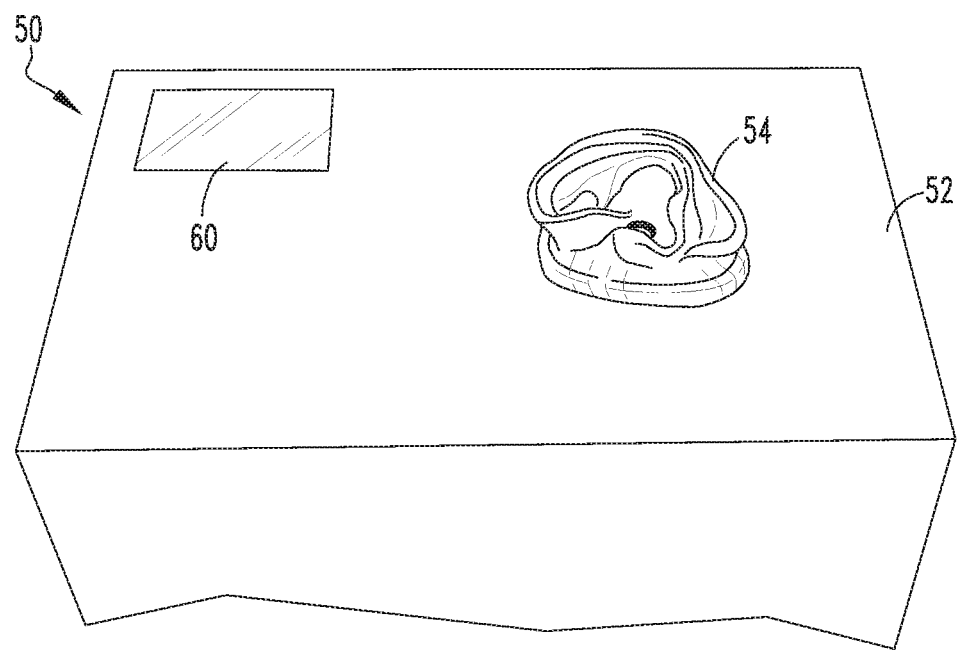
FIG. 6 shows a view of the front and top of a training device in accordance with another example embodiment of the present invention.
Figure 7:
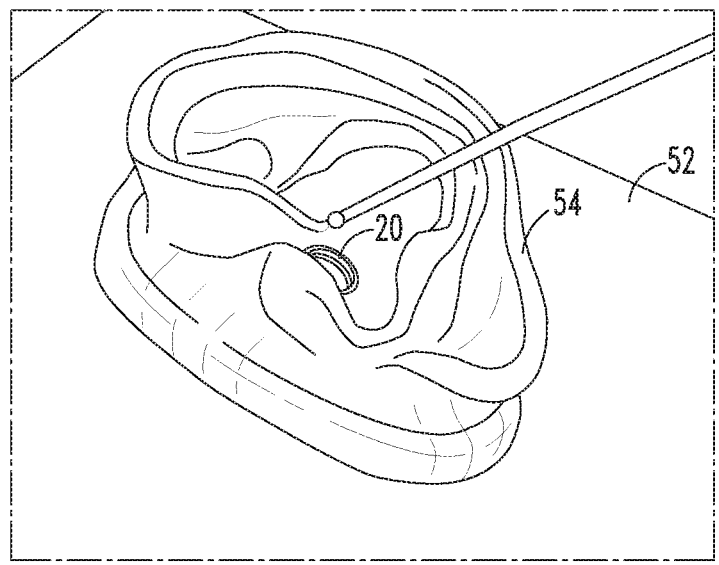
FIG. 7 shows a detailed view of a portion of the training device of FIG. 6.
Figure 9:
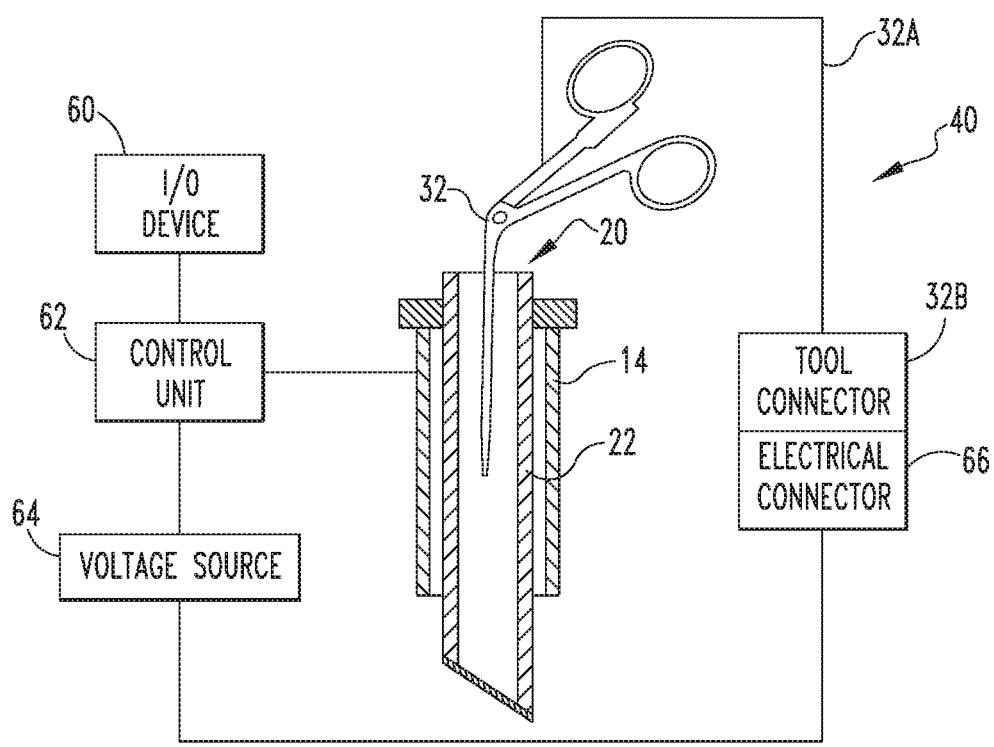
FIG. 9 shows a schematic electrical diagram of the major electrical components in the training device of FIG. 6.

Referring now to FIG. 6, a front/top view of another training device 50 for performing a simulated myringotomy procedure placing a tympanostomy tube in a simulated ear drum of a patient in accordance with the present invention is shown. Similar to training device 10 previously discussed, training device 50 includes a housing 52 having a receptacle 14 and canal structure 20 as previously described mounted thereon. Unlike device 10, device 50 includes an anatomically correct model ear structure 54 disposed about canal structure 20, which provides for a generally more realistic simulation. Also, as shown in the schematic of FIG. 9, unlike device 10, device 50 also includes an I/O (input/output) device 60 electrically connected to a control unit 62. In the example embodiment shown in FIG. 6, I/O device 60 is in the form of a touchscreen. It is to be appreciated that other combined or separate input and/or output devices may be employed without varying from the scope of the present invention. This simulation device can additionally optionally include a compartment that stores the surgical tools needed for the procedure.

In the exemplary embodiment shown in FIGS. 6-9, control unit 62 comprises a processor portion and a memory portion, and may be, for example and without limitation, a microcontroller or a microprocessor or other suitable processing device that interfaces with a suitable memory device. The memory portion can be any one or more of a variety of types of internal and/or external storage media such as, without limitation, RAM, ROM, EPROM(s), EEPROM(s), FLASH, and the like that provide a storage register, i.e., a non-transitory machine readable medium, for data storage such as in the fashion of an internal storage area of a computer, and can be volatile memory or nonvolatile memory. The memory portion of control unit 62 has stored therein a number of routines that are executable by the processor portion of control unit 62. Although shown as being two different components, it is to be appreciated that I/O device 60 and control unit 62 may be integrated as a single component without varying from the scope of the present invention.

Continuing to refer to FIG. 9, a voltage source 64 (e.g., without limitation, a DC power supply) is disposed between control unit 62 and an electrical connector 66, which is positioned and structured in a similar manner as electrical connector 46 previously described. It is to be appreciated that the arrangement shown in FIGS. 6-9 functions generally in a similar manner as that previously discussed in regard to FIGS. 1-5, except instead of providing only an audible and/or visual indication when tool 32 contacts canal structure 20 (and thus closes the circuit), control unit 62 is structured to additionally keep track of such occurrences and thus may provide a score or other indication of the user's performance. Device 60 may also provide a visual and/or audio feedback either via a signal produced by control unit 62, via an arrangement as previously discussed in regard to device 10, or via any other suitable means.

In the illustrated embodiment, I/O device 60 consists of an LCD screen. When the user starts a simulation they may either enter their name to begin a practice run or log in as an instructor to see the progress of all students who have logged in. The user then selects "Start" when they are ready to begin. At this point the timer begins, and the user may start the procedure. During the procedure, if a surgical tool makes contact with the ear canal, an LED and/or buzzer will be triggered. Additionally, the LCD screen will display the addition of 1 "touch" to a running tally of total touches per trial. During a procedure, the user will make an incision in membrane 24 and may place a small ear tube into the opening. When this step is finished, the user will press "End" to stop data collection for that trial. The trial's run time and total number of touches is saved under the person's username in the memory portion of the control unit 62 and may be accessed later for reference.

Figure 8A:
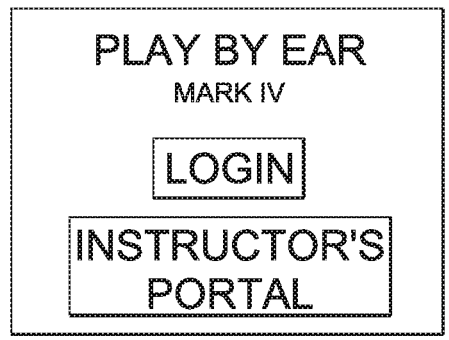
FIGS. 8A-8D show example embodiments of displays which may be shown on the display of the training device of FIG. 6.
Figure 8B:
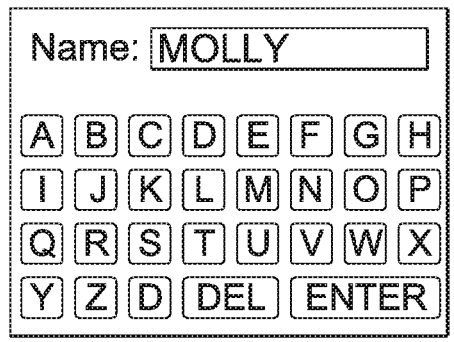
Figure 8C:
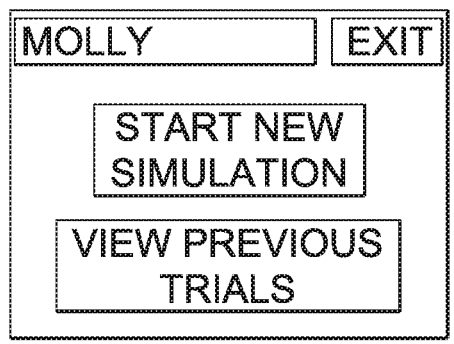
Figure 8D:
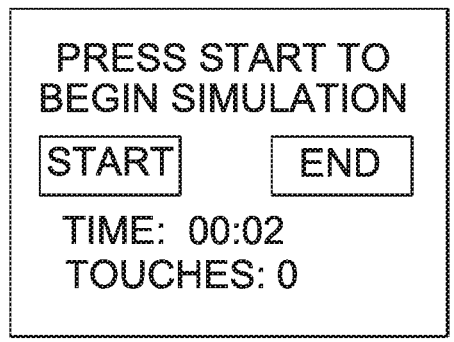

FIGS. 8A-8D show example embodiments of displays which may be shown on I/O device 60 in accordance with embodiments of the present invention. More particularly, FIG. 8A shows an example of an initial screen wherein a user may elect to login or access an "Instructor's Portal" (wherein an instructor: may set attributes of the simulated procedure, e.g., without limitation, acceptable procedure duration, number of touches allowed, etc.; may view results of previous training sessions; or perform/view other items). FIG. 8B shows an example of a display having an interactive keypad in which a user is entering the username "MOLLY". FIG. 8C shows a display in which a username has been previously entered and the user is able to elect to "START NEW SIMULATION" or to "VIEW PREVIOUS TRIALS". FIG. 8D shows a display provided to a user for indicating a procedure is starting/ending. Such display also provides an indication of the time elapsed during the procedure and the number of touches which have occurred during the procedure. It is to be appreciated that the displays shown in FIGS. 8A-8D are provided for example purposes only and that other displays/content may be provided without varying from the scope of the present invention.

From the foregoing description, it is to be appreciated that the overall system described in conjunction with FIGS. 6-9 provides the benefits of recording attributes of a training procedure (e.g., without limitation, user information, elapsed time, number of touches) while also providing the benefits of the system described in conjunction with FIGS. 1-5, albeit at a greater overall cost.

Figure 10:
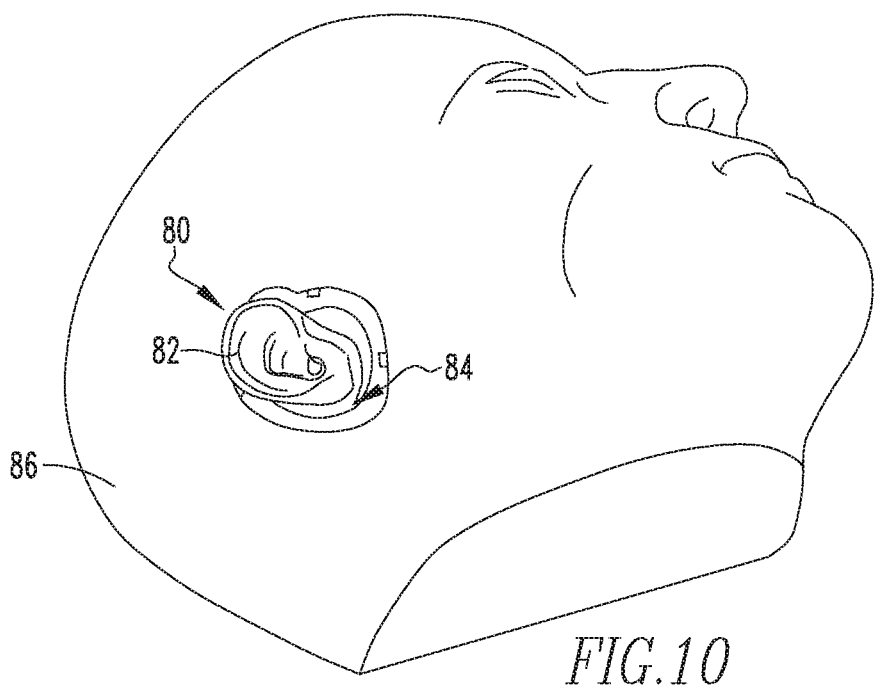
FIG. 10 shows an isometric view of another training device positioned in a mannequin head in accordance with an example embodiment of the present invention.
Figure 11:
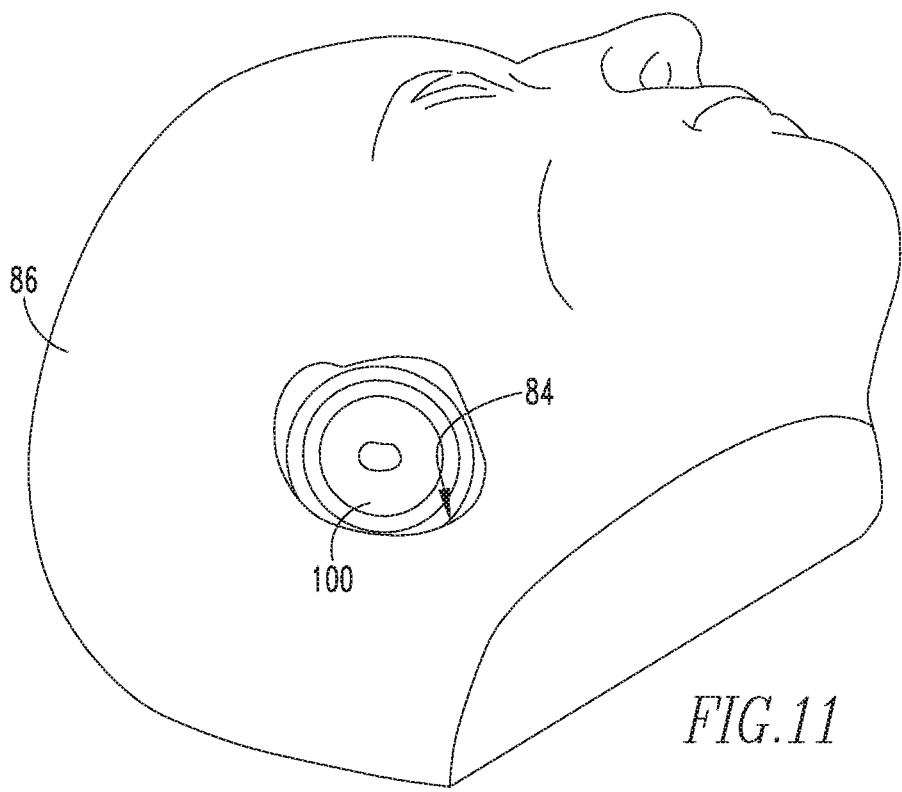
FIG. 11 shows an isometric view of the mannequin head of FIG. 10 showing the training device with a front portion removed and a membrane disposed on a front side of a rear portion of the training device.
Figure 12:
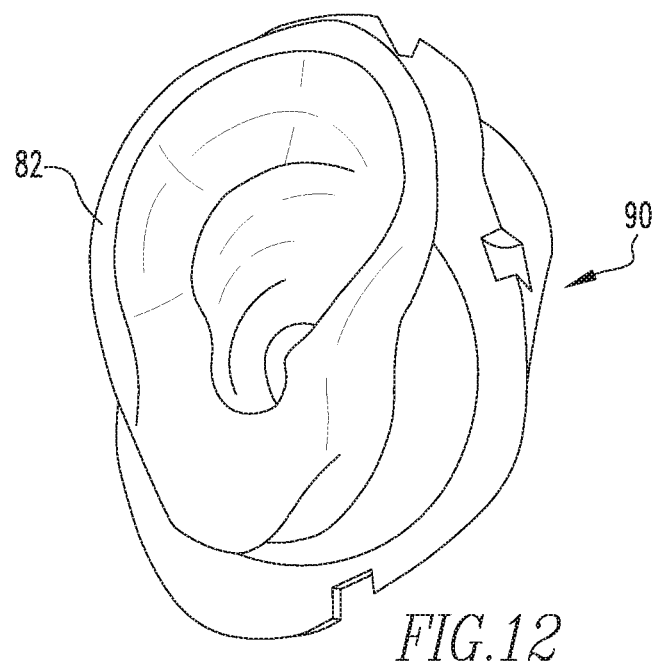
FIG. 12 shows an isometric view of the front portion of the training device which was removed in the view of FIG. 11.
Figure 13:
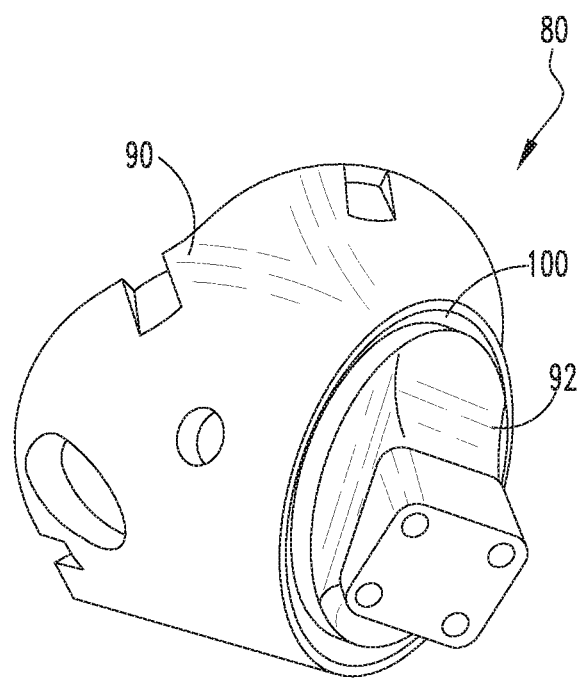
FIG. 13 shows a rear isometric view of the training device of FIG. 10.
Figure 14:
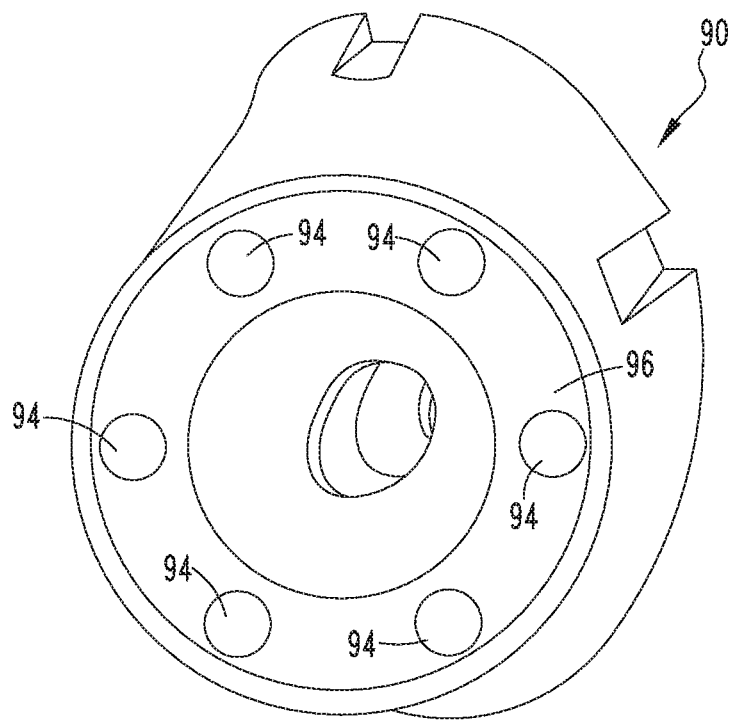
FIG. 14 shows a rear view of the front portion of FIG. 12.
Figure 15:
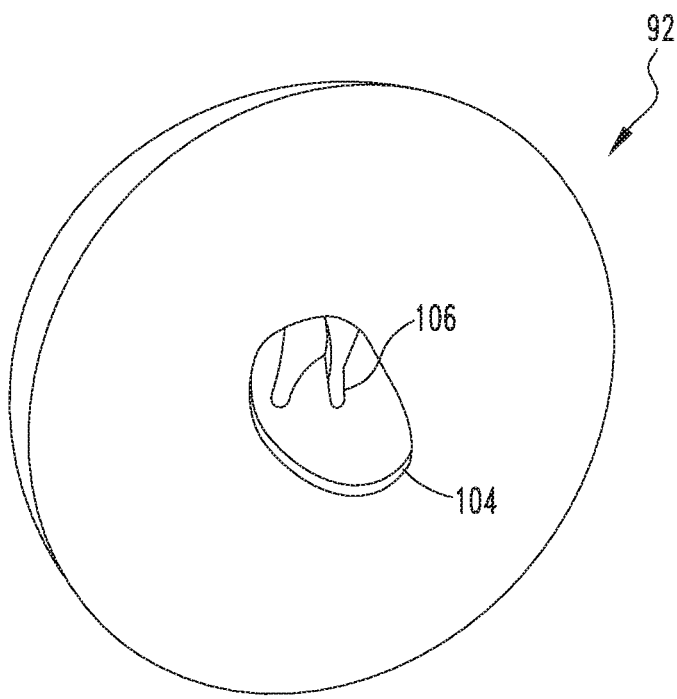
FIG. 15 is a front view of the rear portion of FIG. 11.

Referring now to FIGS. 10-16, a further example embodiment of a training device 80 is illustrated. Training device 80 includes a simulated ear 82 which may be formed from a silicone rubber or other suitable material. As shown in FIGS. 10 and 11, training device 80 may be disposed in a cooperatively shaped housing 84 formed in a simulated human head 86. Continuing to refer to FIG. 11 as well to FIGS. 12-16, training device 80 includes a front portion 90 and a rear portion 92 which is selectively coupled thereto. In the example embodiment illustrated, such selective coupling is accomplished via a number of magnets 94 disposed in a rear facing portion 96 of front portion 90, however, it is to be appreciated that other suitable selective coupling arrangements may be employed without varying from the scope of the present invention. A membrane 100, which simulates a tympanic membrane, is disposed between front portion 90 and rear portion 92 and generally secured and slightly tensioned therebetween. It is to be appreciated that such arrangement provides for membrane 100 to be easily replaced as needed.

Figure 16:
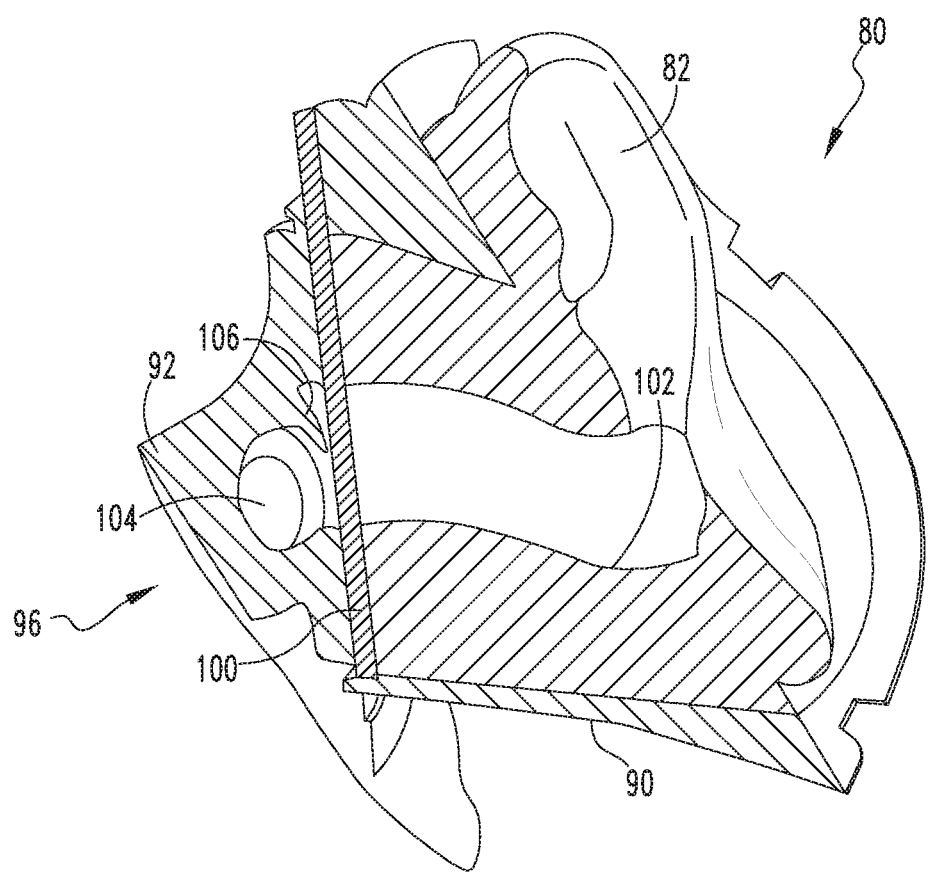
FIG. 16 is a sectional view of the training device of FIG. 10.

Referring now to FIG. 16, front portion 90 includes a simulated ear canal 102 which extends from simulated ear 82 to rear facing portion 96 of front portion 90. Ear canal 102 may be formed to replicate an anatomically correct ear canal. Similarly, rear portion 92 may be formed to include a generally anatomically correct middle ear cleft region 104 including a simulated auditory ossicle 106. From the foregoing description it is to be appreciated that training device 80 provides a generally life-like replica of a human ear, ear canal, ear drum, and middle ear cleft region of a human for interaction by a trainee. Similar to training devices 10 and 50 previously discussed, training device 80 provides for real-time auditory and visual feedback as well as stored feedback regarding the number of touches and duration of procedures performed.

Figure 17:
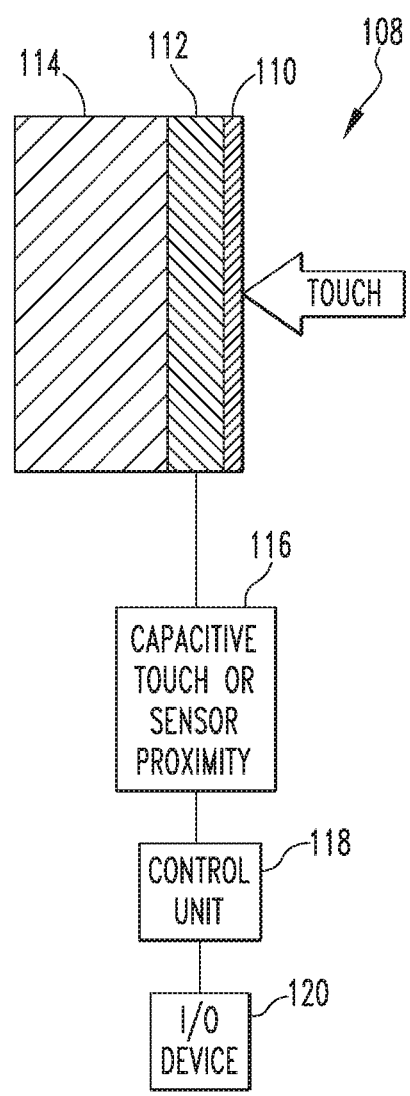
FIG. 17 is a schematic representation of a capacitive touch sensing arrangement in accordance with an example embodiment of the present invention.

In order to provide such feedback, device 80 utilizes capacitive sensing technologies in one or both of canal 102 and/or middle ear cleft region 104. FIG. 17 is a schematic diagram showing an arrangement in which a capacitive touch sensing or proximity sensing system 108 is utilized. In such arrangement, the ear canal (or other structures) are lined with or constructed of a conductive material 112. Examples of such conductive materials include, without limitation, metal foil, conductive fabric, or a conductive polymer. An optional thin surface layer or "skin" coating 110 (e.g., without limitation, silicone, paint, etc.) can be applied over the conductive material 112 to provide a surface with desired visual and mechanical characteristics which would be contacted (i.e., touched) by a surgical instrument during a procedure. Depending on the application, conductive material 112 may be backed by a rigid layer 114. Alternatively, conductive material 112 may comprise a substantial enough structure to eliminate any need for rigid layer 114. For example, without limitation, a 3D-printed rigid plastic or metal may be employed to create middle ear cleft region 104.

Continuing to refer to FIG. 17, conductive material 112 is electrically connected to a capacitive touch or proximity sensor 116 which is electrically connected to a control unit 118. Such capacitive touch or proximity sensors are commonly available: examples include, without limitation, the Freescale Semiconductor MPR121 Proximity Capacitive Touch Sensor Controller and the Atmel AT42QT1010 One-Channel Touch Sensor or Atmel AT42QT1070 QTouch 7-channel Sensor. Input and output to and from control unit 118 is provided by a suitable I/O device 120 which is electrically connected to control unit 118. In operation, the capacitance of conductive material 112 varies when a conductive object (e.g., a surgical tool) is brought in proximity to or in contact with conductive material 112. The capacitive sensor detects this change in capacitance and generates an output signal that is sent to control unit 118. By adjusting parameters for capacitive sensing measurements, system 108 can be used to detect both actual contact of the surgical tool with the surface of the simulated ear canal or close proximity to the surface. By adjusting the compliance and thickness of the surface layer 110, it may also be possible to provide a force threshold such that contact or touch is signaled only when force applied by the surgical tool to the surface of the simulated ear canal exceeds said threshold. This threshold could be chosen to reflect a magnitude of contact force that would cause injury to the ear canal in a real patient. In this arrangement, the surgical tool would need to compress the surface layer to a sufficient degree that the tool would be in sufficient proximity to the conductive layer 112 to trigger the capacitive touch or proximity sensor.

Additionally, a capacitive sensor such as described in U.S. Pat. No. 6,033,370 could be incorporated into system 108 to support detection of the force with which the surgical instrument contacts the surface of the simulated ear canal.

The capacitive sensing arrangement 108 has the advantage of providing for the use of standard tools without the need for wires or external sensing equipment to be attached to the surgical tools, thus providing complete non-encumbrance of the tools. Also, sensing arrangement 108 may be completely encased in the device 80 and not evident to the user, thus promoting a realistic experience.

It is to be appreciated that the system described herein enables details of a user's training to be sensed, recorded, and selectively manipulated. Accordingly, a user's past scores may be provided in a game-like manner to encourage continued self-directed improvement that is enjoyable. The modular design allows for ear canals which may be upgraded so residents can train on various ear canal morphologies. The modular design also provides for readily replaceable, disposable simulated tympanic membranes. Additionally, the feedback system eliminates the need for a supervising doctor to observe the residents practicing the procedure. Thus, the residents can independently practice and then the instructor can log on and see all past scores of students.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for performing a myringotomy training procedure placing a tympanostomy tube in a simulated ear drum of a patient, the system comprising:
   a frame comprising an electrically conductive receptacle having an opening defined in an outer surface of the frame;
   a canal structure removably disposed in the receptacle, the canal structure comprising:
      a tubular portion formed from a conductive material disposed about a longitudinal axis, the tubular portion having a first end and an opposite second end,
      a flanged portion formed from a conductive material which extends outward from the tubular portion at or about the first end of the tubular portion and is electrically connected to the tubular portion, the flanged portion making electrical contact with the receptacle when the canal structure is disposed in the receptacle and being sized and configured to prevent the canal structure from passing through the receptacle, and
      a membrane selectively coupled to the second end of the tubular portion.

2. The system of claim 1, wherein the frame is formed from a nonconductive material.

3. The system of claim 2, wherein the frame is formed from a ball.

4. The system of claim 3, wherein the ball comprises a tennis ball.

5. The system of claim 1, wherein the membrane comprises a polymer film.

6. The system of claim 1, wherein the second end of the tubular portion is disposed at an oblique angle relative to a plane disposed perpendicular to a longitudinal axis of the tubular portion.

7. The system of claim 1, further comprising a voltage source electrically connected to the conductive material of the tubular portion and to a medical tool formed from another conductive material so as to form a closed electrical circuit when the medical tool is in contact with the conductive material of the tubular portion.

8. The system of claim 7, wherein the electrical circuit comprises one or more of: a visual indicator, an audible indicator, or a vibro-tactile indicator electrically connected therein.

9. The system of claim 7, further comprising an anatomically correct ear structure disposed about the first end of the tubular portion of the canal structure.

10. The system of claim 7, further comprising a control unit electrically connected in the electrical circuit and an input/output device electrically connected to the control unit.

11. The system of claim 10, wherein the input/output device comprises a display screen.

12. The system of claim 10, wherein the control unit comprises an electronic memory which is structured to store data related to one or more procedures performed using the system.

13. The system of claim 1, wherein the system further comprises a voltage source electrically connected to the conductive material of the tubular portion via the flanged portion and to a medical tool formed from another conductive material so as to form a closed electrical circuit when the medical tool is in contact with the conductive material of the tubular portion, and
   wherein the medical tool is structured to be inserted into the tubular portion to perform operations on the membrane.

14. The system of claim 13, wherein the electrical circuit comprises an indicator electrically connected therein.

15. The system of claim 14, wherein the indicator comprises at least one of a visual indicator, an audible indicator or a vibro-tactile indicator.

16. A system for performing a myringotomy training procedure placing a tympanostomy tube in a simulated ear drum of a patient, the system comprising:
   a canal structure comprising:
      a tubular portion having an inner surface disposed about a longitudinal axis, the tubular portion having a first end and an opposite second end, and
      a membrane removably coupled to the second end of the tubular portion; and
      a capacitive touch sensing system consisting of a conductive layer disposed on, or subjacent to, the inner surface of the tubular portion.

17. The system of claim 16, wherein a coating is provided on the conductive layer, the coating being positioned and structured to be contacted by a surgical instrument during a procedure using the system.

18. The system of claim 16, wherein the capacitive sensing system is structured to detect contact by a surgical instrument with the inner surface of the tubular portion.

19. The system of claim 16, wherein the capacitive sensing system is structured to detect the proximity of a surgical instrument disposed adjacent thereto, but not in contact therewith.

20. The system of claim 16, wherein the capacitive sensing system is structured to determine one of a force or pressure exerted thereto by a surgical instrument.

21. The system of claim 16, wherein the conductive layer is disposed on the inner surface of the tubular portion such that the conductive layer is structured to be directly contacted by a surgical instrument.

22. A system for performing a myringotomy training procedure placing a tympanostomy tube in a simulated ear drum of a patient, the system comprising:
- a canal structure comprising:
  - a tubular portion having an inner surface disposed about a longitudinal axis, the tubular portion having a first end and an opposite second end, and
  - a membrane removably coupled to the second end of the tubular portion; and
- a capacitive sensing system extending the entire length of the tubular portion and having a conductive layer disposed on or subjacent to the inner surface of the tubular portion.

* * * * *

UNITED STATES PATENT AND TRADEMARK OFFICE
CERTIFICATE OF CORRECTION

PATENT NO. : 10,748,453 B2
APPLICATION NO. : 15/599964
DATED : August 18, 2020
INVENTOR(S) : Noel Jabbour et al.

Page 1 of 1

It is certified that error appears in the above-identified patent and that said Letters Patent is hereby corrected as shown below:

On the Title Page

"(73) Assignee: University of Pittsburgh - Of the Commonwealth Systems of the Higher Education"
Should read:
--(73) Assignee: University of Pittsburgh - Of the Commonwealth System of Higher Education--

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*